T. S. CULBREATH.
ROAD MAKING MACHINE.
APPLICATION FILED MAR. 20, 1915.
1,166,188.
Patented Dec. 28, 1915.
2 SHEETS—SHEET 1.
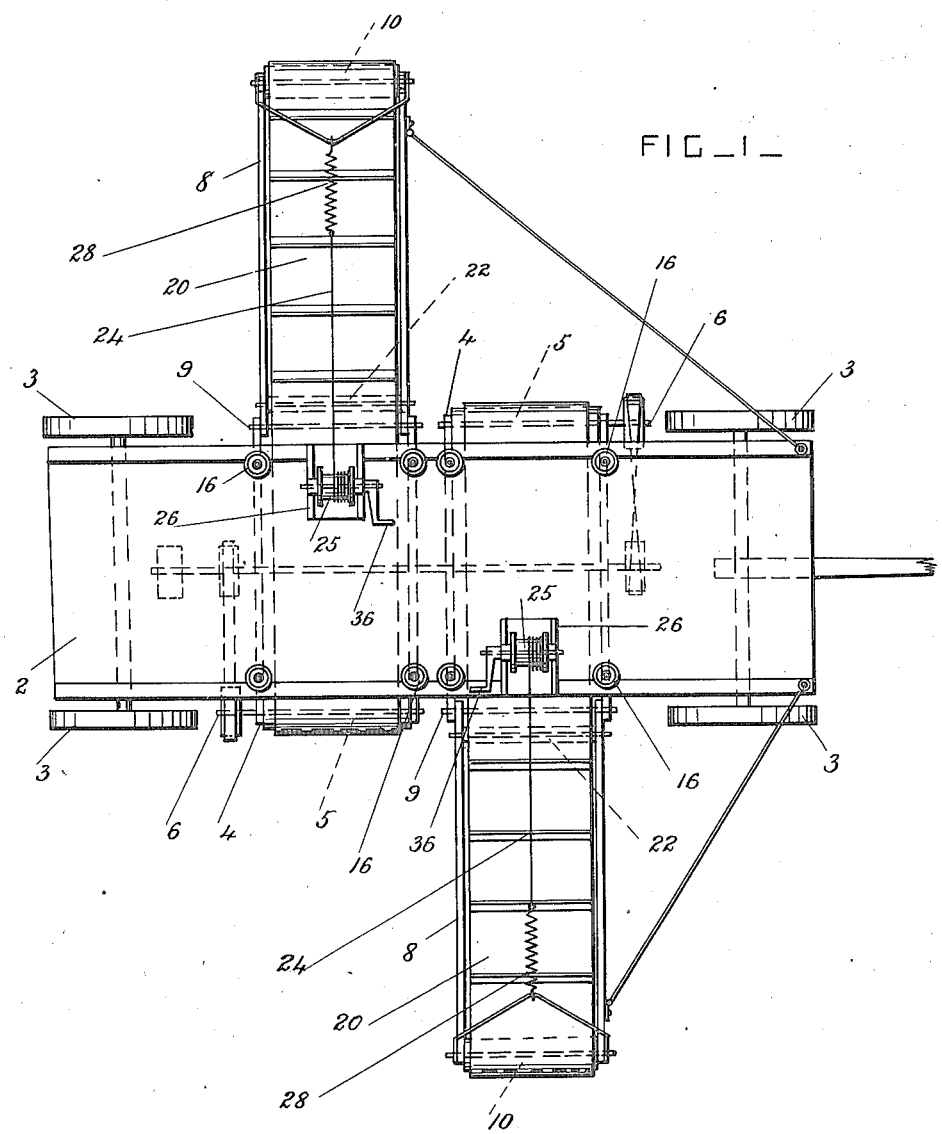
FIG_1_
Inventor
Thomas S. Culbreath
By Herbert W. J. Jenner.
Attorney

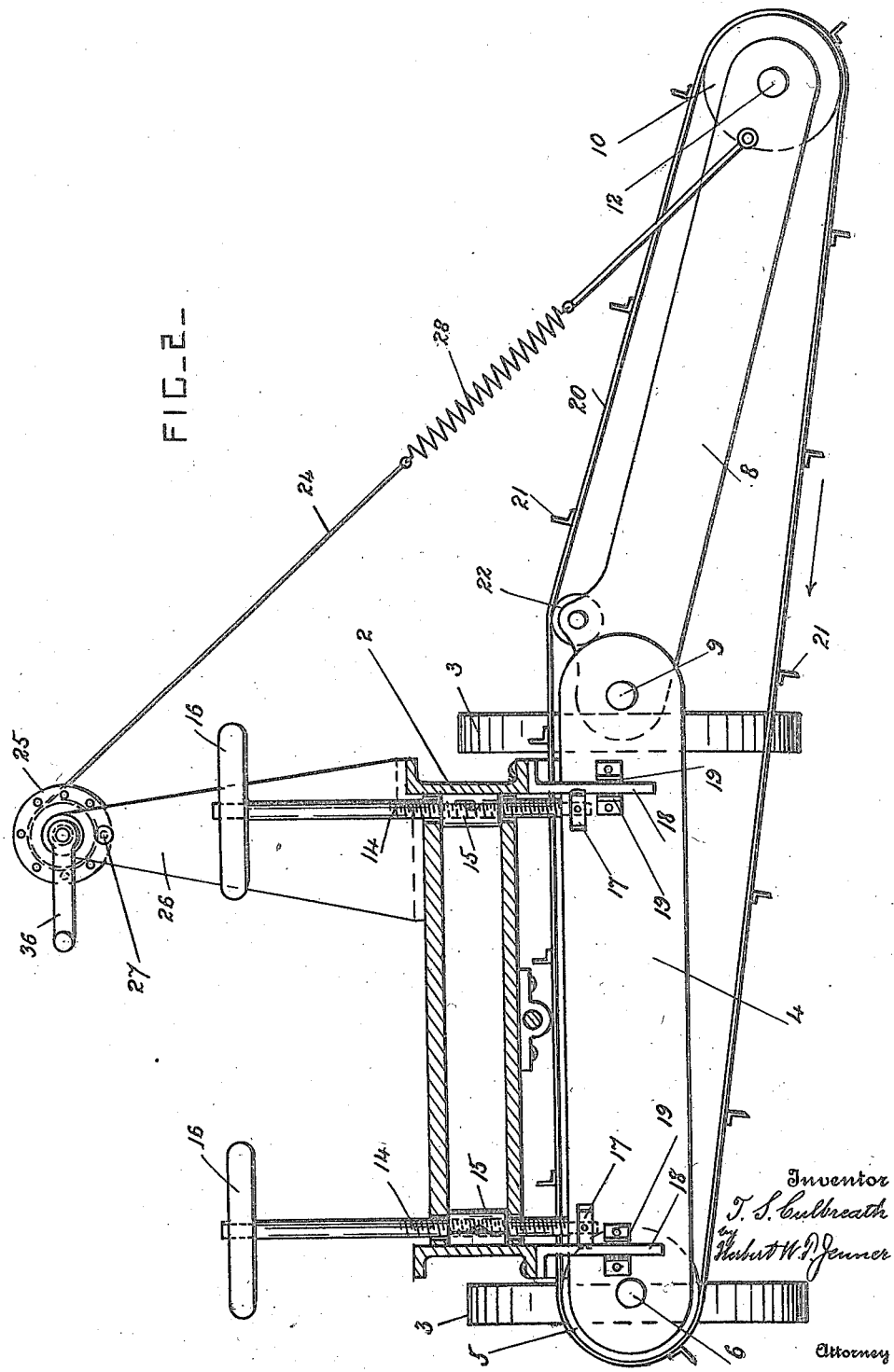

UNITED STATES PATENT OFFICE.

THOMAS S. CULBREATH, OF PRATT, KANSAS.

ROAD-MAKING MACHINE.

1,166,188.  Specification of Letters Patent.  Patented Dec. 28, 1915.

Application filed March 20, 1915. Serial No. 15,787.

*To all whom it may concern:*

Be it known that I, THOMAS S. CULBREATH, a citizen of the United States, residing at Pratt, in the county of Pratt and State of Kansas, have invented certain new and useful Improvements in Road-Making Machines; and I do hereby declare the following to be a full, clear, and exact description of the invention, such as will enable others skilled in the art to which it appertains to make and use the same.

This invention relates to road making machines which scrape the surface of roads from the sides toward the center; and it consists in the novel construction and combination of the parts hereinafter fully described and claimed.

In the drawings, Figure 1 is a plan view showing a diagram of a road making machine constructed according to this invention. Fig. 2 is an end view of one of the scraping mechanisms or drags, drawn to a larger scale, and showing the main frame in section.

A main frame 2 is provided and is mounted on road wheels 3, and is adapted to be drawn along the road like a wagon or other vehicle in any approved way.

Two separate scraping mechanisms are provided, and are secured to the frame 2, one in front of the other. One of these devices projects at one side of the frame, and the other device projects at the other side, and as the devices are similar except for being made right and left hand, the description will be confined to one of them.

A conveyer frame 4 is arranged crosswise of and below the main frame 2, and a driving drum or pulley 5 is secured on a driving shaft 6 which is journaled at one end of the frame 4. This shaft is driven by a gasolene engine or any other approved motor, and the driving shafts of both scraping mechanisms are preferably driven by a single motor, which is operatively connected to them in any approved manner. A hinged frame 8 is pivoted to the other end portion of the frame 4 from the driving shaft, by a pin 9, and a drum or pulley 10 is mounted on a shaft 12 at the free end portion of the hinged frame 8.

The hinged frame projects laterally at one side of the frame 2. The frame 4 is suspended from the main frame in a substantially horizontal position by four screws 14. These screws work in nuts 15 secured to the frame 2, and they are provided with handles or hand wheels 16 for revolving them. The lower ends of the screws 14 are connected to collars or sockets 17 secured to the frame 4. When the screws are revolved the frame 4 is raised or lowered as required, and may be set at any desired level below the main frame 2. Guides 18 are provided on the main frame 2 which engage with lugs 19 on the frame 4 and prevent the frame 4 from sliding endwise.

An endless conveyer apron 20 is arranged to work over the drums 5 and 10, and is preferably formed of chains or chain fabric, but any strong material which can pass around the drums and be driven by them, may be used. This conveyer apron 20 is provided with a series of scrapers 21 for engaging with the road bed, and it is driven in the direction of the arrow in Fig. 2. A guide roller 22 for the apron is journaled at the inner end portion of the hinged frame, adjacent to its pivot, to prevent the upper stretch of the apron from sagging.

The free end portion of the hinged frame is raised and lowered by means of a cord or other flexible connection 24 which is wound upon a barrel 25. The barrel 25 is journaled at the upper part of an upright 26 secured to the main frame, and is provided with a handle 36 for revolving it, and a pin or stop 27 for holding it stationary after the hinged frame has been adjusted. A spring 28 is provided between the connection 24 and the hinged frame, so that the free end portion of the frame is raised easily to a limited extent by a slight resistance to the scrapers as they pass to the underside of the drum 10 and engage with the road-bed.

The machine is drawn or propelled along the road as required, and the frames 4 and 8 are adjusted so that the lower stretch of the endless conveyer apron makes a suitable angle to the horizontal. The surface of the road-bed is scraped upwardly from the side to the center, so that it is made smooth and all holes or depressions are filled up.

What I claim is:

1. In a road making machine, a supporting carriage, an inner conveyer frame arranged crosswise of the carriage, guides which prevent the inner conveyer frame from sliding laterally and longitudinally, adjusting mechanism for moving the inner conveyer frame bodily and vertically, an outer conveyer frame pivoted to one end portion of the inner conveyer frame, adjusting mechanism supporting the free end portion of the outer conveyer frame, and a traveling conveyer apron provided with road scrapers and supported by the said conveyer frames with its lower stretch hanging between the extreme ends of the conveyer frames and free to follow the contour of the road.

2. In a road making machine, a supporting carriage, an inner conveyer frame arranged crosswise of the carriage, vertical guides secured to the carriage at each side of the inner conveyer frame and preventing it from sliding laterally, lugs on the inner conveyer frame which engage with the said guides and prevent the said frames from sliding longitudinally, means for adjusting the inner frame bodily and vertically, an outer conveyer frame pivoted to one end portion of the inner conveyer frame, adjusting mechanism supporting the free end portion of the outer conveyer frame, and a traveling conveyer apron provided with road scrapers and supported by the said conveyer frames with its lower stretch hanging between the extreme ends of the conveyer frames and free to follow the contour of the road.

In testimony whereof I have affixed my signature in the presence of two witnesses.

THOMAS S. CULBREATH.

Witnesses:
L. B. CRAMER,
M. C. GIPTON.